United States Patent [19]

Emmons et al.

[11] 4,131,580

[45] * Dec. 26, 1978

[54] WATER-BASED COATING COMPOSITIONS COMPRISING A VINYL ADDITION POLYMER AND AN ACRYLIC ESTER OF DICYCLOPENTADIENE

[75] Inventors: William D. Emmons, Huntingdon Valley; Kayson Nyi, Sellersville; Peter R. Sperry, Doylestown, all of Pa.

[73] Assignee: Rohm and Haas Company, Philadelphia, Pa.

[*] Notice: The portion of the term of this patent subsequent to Jan. 31, 1995, has been disclaimed.

[21] Appl. No.: 851,325

[22] Filed: Nov. 14, 1977

Related U.S. Application Data

[63] Continuation of Ser. No. 664,597, Mar. 8, 1976, abandoned.

[51] Int. Cl.² ..................... C08L 33/08; C08L 33/12
[52] U.S. Cl. .................. 260/29.6 RW; 260/29.6 RB; 260/29.6 H; 260/29.6 M; 260/29.6 MM; 260/29.6 R; 260/29.7 UP; 260/29.7 UA; 260/29.7 W; 428/482
[58] Field of Search ............. 260/29.6 RW, 29.6 RB, 260/29.6 H, 29.6 M, 29.6 MM, 29.6 R, 29.7 UP, 29.7 UA, 29.7 W; 428/482

[56] References Cited

U.S. PATENT DOCUMENTS

| 2,462,400 | 6/1949 | Hoover ................................ 526/283 |
| 3,650,669 | 3/1972 | Osborn et al. .................... 204/159.12 |
| 3,703,596 | 11/1972 | Marx et al. .................. 260/29.6 TA |
| 3,711,575 | 1/1973 | Kakefuda et al. ................. 260/881 |
| 3,772,062 | 11/1973 | Shun et al. ...................... 260/837 R |
| 3,956,217 | 5/1976 | Gazeley ....................... 260/29.7 NR |

FOREIGN PATENT DOCUMENTS

| 1,954,548 | 5/1971 | Fed. Rep. of Germany ..... 260/29.6 R |
| 960662 | 6/1964 | United Kingdom ............... 260/29.6 B |
| 1226657 | 3/1971 | United Kingdom ............... 260/29.6 R |
| 13311859 | 2/1973 | United Kingdom ............... 260/29.6 R |

*Primary Examiner*—M. J. Welsh
*Attorney, Agent, or Firm*—Lester E. Johnson

[57] ABSTRACT

The present invention is concerned with film-forming polymer dispersions, especially in aqueous systems, such as aqueous solutions of polymers of monoethylenically unsaturated monomers as well as latices or dispersions in an aqueous medium of water-insoluble particles of polymers, such as those obtained by emulsion polymerization. It involves the addition to such aqueous polymer systems in order to improve hardness, blocking-resistance and film-formation at room temperature or below, of a non-volatile, reactive monomer comprising dicyclopentenyl acrylacte or methacrylate to serve as an air-curing coalescent.

22 Claims, No Drawings

WATER-BASED COATING COMPOSITIONS COMPRISING A VINYL ADDITION POLYMER AND AN ACRYLIC ESTER OF DICYCLOPENTADIENE

This is a continuation, of application Ser. No. 664,597 filed Mar. 8, 1976 and now abandoned.

DESCRIPTION OF THE INVENTION

In the use of aqueous dispersions of emulsion polymers, the particles of which are water-insoluble, the effectiveness of the dispersion in forming a film after the polymer dispersion has been coated upon a surface to be painted depends upon the glass transition temperature of the dispersed polymer and the temperature at which the coating is allowed to dry. This is particularly well pointed out in the Conn et al. U.S. Pat. No. 2,795,564, which discloses the applicability of many acrylic polymers in the making of water-based paints. As pointed out in that patent, the polymer obtained in aqueous dispersion by emulsion polymerization of one or more monoethylenically unsaturated monomers (having a group $H_2C = C<$) may have an apparent second order transition temperature, or glass transition temperature which depends upon the components and the proportion of such components in the polymer. The patent points out that certain of this type of monomer, such as methyl methacrylate, (styrene, vinyl acetate, vinyl chloride, and acrylonitrile being similar in this respect) tend to produce homopolymers which have relatively high glass transition values, the particular glass transition temperature referred to in that patent being designated by the symbol $T_i$ as defined in the patent. The monomers just referred to, when homopolymerized, produce hard polymers, that is, polymers having a glass transition temperature or $T_i$ value above 20° C. On the other hand, the patent mentions numerous monomers of monoethylenically unsaturated type which produce relatively soft homopolymers, this characterization representing polymers having glass transition temperatures or $T_i$ values of 20° C. or less.

The patent referred to discloses that by copolymerizing various hard and/or soft monomers in predetermined proportions, a copolymer can be obtained having a predetermined glass transition temperature or $T_i$ value in a wide range from well below $-40°$ C. up to 150° C. or higher. Coatings made from aqueous dispersions of the various polymers may be such that application of the coating compositions or aqueous-based paints made from such polymers can be effected at normal room temperature or even lower with expectation of good film-forming qualities if the $T_i$ value of the particular polymer involved is not above the ambient temperatures at which the coating is performed. For example, coatings made from aqueous-based paints containing a polymer having a $T_i$ value of about 15° C. generally can be applied at room temperatures and result in good film formation simply by drying of the coated film in the ambient atmosphere. On the other hand, if the coating composition contains as its primary filmforming component an emulsion polymer having a $T_i$ value above room temperatures, such as from about 35° C. and up, the coated film obtained from such a paint may require elevated temperatures, such as 35° C. and up, during drying in order to assure that the polymer particles are adequately coalesced or fused into a continuous film during the drying. Some polymers may be characterized by a glass transition temperature substantially above room temperature such as up to 30°-35° C. but still would be capable of forming a continuous film at normal room temperatures because of an affinity for water (hydrophilicity) of a particular polymerized unit in the dispersed polymer particles. An example of such a monomeric component is vinyl acetate. The hydrophilicity of polymer as a result of its content in substantial amount of vinyl acetate (or equivalent monomer) aid in coalescing the polymer particles into a continuous film at temperatures lower than the $T_i$ value of such polymer as determined by a standard test.

The making of water-based paints with polymers having low $T_i$ values to enable the aqueous-based paint to be applied at normal room temperature without the use of a plasticizer results in films which in many cases are inadequately hard and tough after drying. On the other hand, the use of polymers having high glass transition temperatures substantially above room temperature such as above 35° C. generally requires the presence of a permanent or fugitive plasticizer (the plasticized polymer having a lower $T_i$ value) or a high temperature of drying in order to provide good continuous films on the surfaces coated.

In accordance with the present invention, addition of dicyclopentenyl acrylate and/or dicyclopentenyl methacrylate to aqueous coating compositions, such as water-based paints, prepared from water-soluble addition polymers or from aqueous dispersions of water-insoluble addition polymer particles, such as those obtainable by emulsion polymerization provides a versatility to such compositions not heretofore obtained without great trouble and expense.

Hereinafter, the symbol DCPA is used to represent the acrylate just referred to, the symbol DCPMA is used to refer to the corresponding methacrylate and DCP(M)A is used as a generic term to refer to both, a mixture of both, or either of these materials.

More specifically, the term "DCP(M)A", is meant to encompass compounds represented by the structural formula

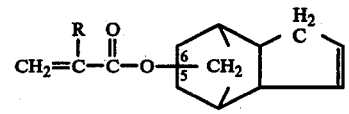

wherein R is H or $CH_3$, set forth in companion application U.S. Ser. No. 665,017; the use of the recited terminology is not intended to encompass compounds having any other structural formula.

In accordance with the present invention, it has been found that the addition of DCP(M)A to coating compositions based on vinyl addition polymers of monoethylenically unsaturated monomers, particularly those having a terminal group $H_2C = C<$ is extremely valuable and useful for the purpose of favoring the ease of coating, facility of film-forming action during drying at normal room temperatures and also by rendering the coated film of greater hardness and toughness as a result of the reactive, air-curing characteristics of the DCP(M)A. In general, a small amount of a drier or siccative, by which is meant the type of salt or complex of a polyvalent metal that is commonly employed to hasten the oxidation of drying oils, may be added to accelerate the curing of the coating film during drying. The proportion of DCP(M)A in the coating composition may fall within a wide range depending upon the particular composition, its components and particularly the content of film-forming polymer therein and its apparent second order transition temperature.

When added to an emulsion polymer dispersion, the DCP(M)A plays a role that is quite advantageous. It can serve as a coalescent in that it acts as a plasticizer for the dispersed polymer particles. If the dispersed polymer has a $T_i$ that is above room temperature, e.g., 35° C., so that coating compositions, such as water-base paints, made from the polymer dispersion would not form a continuous film on drying at ambient conditions, enough DCP(M)A can be mixed into the polymer dispersion or coating composition containing such polymer dispersion to lower the $T_i$ and the effective film-forming temperature sufficiently to enable the coatings obtained on coating the compositions to form continuous films at ambient temperature. At the same time, on air-drying of the films the product becomes hard and block-resistant because of the autoxidizable nature of the composition.

Similarly, when the DCP(M)A is added to coatings based on an aqueous dispersion of an emulsion polymer having a low $T_i$ such that film-formation at room temperature would occur without the DCP(M)A, the films obtained from the DCP(M)A containing polymer composition are hardened and toughened upon the air-curing of the DCP(M)A.

The coating compositions preferably contain one or more siccatives or driers. The drier used is any polyvalent metal-containing complex or salt that catalyzes the oxidative curing or drying oils or drying oil-modified alkyd resins. Examples of the driers are various polyvalent metal salts including calcium, copper, zinc, manganese, lead, cobalt, iron and zirconium as the cation. Simple inorganic salts are useful such as the halide, chloride, nitrate, sulfate. Salts of organic acids such as the acetylacetonate, acetate, propionate, butyrate and the like are also useful. The driers may also be complex reaction products of metal oxides, acetates, or borates and vegetable oils. Useful driers also include salts of naphthenic acids or of ($C_8$ to $C_{30}$) aliphatic acids. Examples of the aliphatic or fatty acid component or anion of the drier salt is that of naphthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. Preferred drier salts are those of cobalt and manganese, such as cobalt octoate, cobalt naphthenate and manganese octoate and naphthenate. Mixtures of various driers may be used. The driers mentioned in "Encyclopedia of Chemical Technology," Kirk-Othmer, Volume 5, pages 195–205, published by Interscience Encyclopedia, Inc., N.Y. (1950) may be used.

The proportion of the drier may be quite low and is generally used in the amount of 0.0005 to 2% metal content by weight of the DCP(M)A. The drier may be added to the composition prior to storage provided such addition is made in the absence of oxygen or a volatile stabilizer d) is included in the composition to inhibit or prevent the oxidizing action of the drier and the composition is placed in closed storage containers to prevent volatilization of the inhibitor. The stabilizer may be used in a small proportion of 0.1% to 2% by weight based on the weight of component DCPMA. The stabilizer is generally a volatile ketoneoxime or aldehyde-oxime. Specific examples are methyl ethyl ketone-oxime, methyl butyl ketone-oxime, 5-methyl-3-heptanone-oxime, cyclohexanone-oxime, and butyraldehyde-oxime, Addition of such inhibitors is essential if long stability and pot life of the aqueous compositions containing dispersed polymer, DCP(M)A, and drier are desired.

The coating compositions may contain, of course, other materials as pointed out in the patent referred to earlier including pigments, dispersing agents, sequestering agents, defoaming agents, humectants, thickeners, bactericides, fungicides, odor-modifying agents, and other resinous materials in dispersed forms. The various pigments and other materials that are mentioned in the earlier patent may be used.

In general, the proportion of DCP(M)A that is used in the coating composition may be from about 1% to 200% by weight, preferably 5% to 150% based on the weight of the vinyl addition polymer constituting the main film-forming component of the coating composition. It is to be understood that the acrylic polymers described in Conn et al, U.S. Pat. No. 2,795,564, mentioned hereinabove, are not the only types of vinyl addition polymers that can be modified and improved by the inclusion of the DCP(M)A with a drier. In the copolymer systems of the patent, the hardening component is a lower methacrylate, such as methyl methacrylate, but similar copolymer systems in which the hard lower methacrylate is partly or completely replaced by such hardening monomers as styrene, vinyltoluene, acrylonitrile, methacrylonitrile, vinyl chloride, vinylidene chloride, or vinyl acetate are also improved by the inclusion of DCP(M)A and a drier. It has been found that the DCP(M)A is also useful in conjunction with aqueous coating systems based on natural latices or synthetic latices produced from butadiene, chloroprene, styrene/butadiene copolymers, acrylonitrile-butadiene-styrene copolymers and related synthetic rubber systems which have low $T_i$ values. Films obtained from these dispersions are also improved in respect to hardness by the incorporation of DCP(M)A with a drier.

The use of the DCP(M)A makes it possible to obtain hard, tough coating films from coating compositions which comprise a polymer having a low $T_i$ (which would normally form a soft film). The benefits can be obtained without the use of a plasticizer or with a greatly reduced amount of permanent plasticizer in the compositions.

The incorporation of DCP(M)A in coating compositions is not restricted to those in which the film-forming component comprises or consists essentially of water-insoluble dispersed particles of a polymer or copolymer. It is also useful in conjunction with aqueous solutions of vinyl addition polymers wherein the solubility of the polymer is essentially true solubility by virtue of low molecular weight of the polymer containing hydrophilic groups as well as those characterized by the formation of colloidal solutions.

The soluble polymers may derive their solubility from a large content of hydrophilic groups such as acid mers which can be in acid or in salt form. Examples of such acids include acrylic acid, methacrylic acid, crotonic acid, itaconic acid, maleic acid, citraconic acid, aconitic acid, and the like. The salts may be those of ammonia, amines, such as dimethylaminoethanol, triethylamine, 2-amino-2-methyl-1-propanol, and the like, or an alkali metal, especially sodium, potassium, or lithium. Besides polymers containing large proportions of acid units such as polyacrylic acid, polymethacrylic acid, or copolymers such as copolymers of 15% methacrylic acid and 85% butyl methacrylate, there may be used copolymers containing a large proportion of acrylamide or methacrylamide units or polymers containing a large proportion of amine units such as homopolymers of oxazolidinylethyl acrylate or copolymers of the latter amine-containing polymer with up to 20% by weight of methyl acrylate. Water-solubility may also be derived from polymerized mers containing hydroxyl groups, such as hydroxyethyl acrylate or methacrylate, 2-hydroxypropyl acrylate, 3-hydroxypropyl acrylate. Water-solubility can also be the result of copolymerization of two or more types of the hydrophilizing monomers mentioned herein. The DCP(M)A with a drier in these instances serve to modify the character of the final coating film.

The use of the DCP(M)A in the coating compositions serves several functions or purposes. In aqueous solutions of water-soluble polymers, it aids the adjustment of viscosity to facilitate coating without the necessity to dilute the solution excessively with water or other water-miscible volatile solvent. The DCP(M)A then becomes part of the binder component on air-drying and contributes to the solvent-resistance, water-resistance, alkali-resistance, gloss, hardness, and toughness of the cured coating films. In coating compositions based on aqueous dispersions of water-insoluble polymer particles, e.g., obtainable by emulsion polymerization, the DCP(M)A serves as a coalescent, hardener, toughener, viscosity-controlling aid, and so on. In all cases, the DCP(M)A, on air-dry curing of the coating compositions containing the vinyl polymer, DCP(M)A, and drier, becomes part of the binder in the final cured coating films. Avoidance of volatile organic solvents also reduces pollution.

The non-volatile, reactive component may, and preferably does, consist essentially of DCP(M)A but, if desired, it may comprise a mixture of at least a major proportion (e.g. 51% to 99% by weight) of DCP(M)A and a minor proportion of other non-volatile reactive ethylenically unsaturated monomeric material selected from (1) a higher ($C_{10}$–$C_{20}$) aliphatic ester of acrylic or methacrylic acid, e.g. ($C_{10}$–$C_{20}$) alkyl and ($C_{10}$–$C_{20}$) alkenyl acrylates and methacrylates, and (2) a vinyl ester of a higher ($C_{10}$–$C_{20}$) aliphatic acid, or a minor proportion of non-volatile, reactive dialkyl ($C_1$–$C_8$) maleates, fumarates, and itaconates. Optionally, to improve water-, solvent-, abrasion-, and blocking-resistance, the non-volatile reactive DCP(M)A containing material may also comprise a small amount up to 25%, preferably 2 to 15%, by weight, based on binder weight, of a polyethylenically unsaturated material, such as glycol or polyol (meth)acrylates, e.g. ethylene glycol di(meth)acrylate, 1,4-butanediol di(meth)acrylate, 1,6-hexane diol di(meth)acrylate, 1,3-butylene glycol dimethacrylate, neopentyl glycol di(meth)acrylate, pentaerythritol tri- and tetra-(meth)acrylate, trimethylolpropane trimethacrylate; also allyl(meth)acrylates. Examples of the esters (1) are decyl acrylate, isodecyl acrylate, undecyl acrylate, lauryl acrylate, cetyl acrylate, pentadecyl acrylate, hexadecyl acrylate, octadecyl acrylate, the corresponding methacrylates, and the unsaturated analogs, such as oleyl acrylate or methacrylate, linoleyl(meth)acrylate, linolenyl(meth)acrylate, and so on. Examples of (2) are vinyl decanoate, vinyl laurate, vinyl oleate, vinyl palmitate, vinyl myristate, and vinyl stearate. Examples of the diesters include dimethyl maleate, fumarate, and itaconate, diethyl maleate, fumarate and itaconate, and dibutyl maleate, fumarate, and itaconate.

In the following examples, which are illustrative of the invention, the parts and percentages are by weight and the temperatures are in C° unless otherwise noted.

EXAMPLE 1

Coating Compositions Based on Hard Latex Polymers and DCPMA

Polymer A is an aqueous latex polymer having the monomer composition: ethyl acrylate, 43.5 parts; methyl methacrylate, 55.5 parts; and methacrylic acid, 1.0 part. The latex is neutralized with ammonium hydroxide and has a pH of 9.5. It is further characterized by: solids content, 46.5%; mean particle diameter, $0.11_u$; $T_i = 32°$ C.

Polymer B is an aqueous latex polymer having the monomeric composition: butyl acrylate, 46 parts; methyl methacrylate, 53 parts; and methacrylic acid, 1 part. The latex is neutralized with ammonia and has a pH of 9.5. It is further characterized by: solids content, 46.5%, mean particle diameter, $0.15_u$; $T_i = 22°$ C.

One set of coating compositions is prepared from polymers A and B respectively by adding DCPMA with stirring, followed by adding 0.1 part of cobalt (II) as the acetyl acetonate and 0.25 part of cyclohexanone oxime per 100 parts of combined latex solids and DCPMA. Other coating compositions are prepared from polymers A and B respectively by adding with stirring the volatile coalescing aid 2,2,4-trimethylpentanediol-1,3 monoisobutyrate (commercial product Texanol®, Eastman Chemical). The various coating compositions are first evaluated for film forming ability i.e. minimum film-forming temperature (MFT) according to ASTM D-2354 with results as given in Table I.

| Polymer | Parts DCPMA or Texanol$^R$/100 Parts Latex Solids | MFT (° C) Visual | MFT (° C) Toughness |
|---|---|---|---|
| A | none | 38 | 37 |
|   | 20 DCPMA | 4 | 11 |
|   | 40 DCPMA | <1 | <1 |
|   | 20 Texanol$^R$ | 5 | 9 |
| B | none | 14 | 19 |
|   | 15 DCPMA | <1 | 2–4 |
|   | 40 DCPMA | <1 | <1 |
|   | 15 Texanol$^R$ | <1 | 2 |

The coatings are then deposited on aluminum test panels to yield 1.3 mil films when dry. After drying for four weeks at ambient conditions, the film properties given in Table II are observed.

Table II

| Polymer | Parts DCPMA or Texanol$^R$/100 Parts Latex Solids | Knoop Hardness No. (KHN) | Pencil Hardness | Printing* |
|---|---|---|---|---|
| A | none | no film—powdery deposit | | |
|   | 20 DCPMA | 7.1 | H | none |
|   | 40 DCPMA | 10.1 | 2H | none |
|   | 20 Texanol$^R$ | 0.5 | HB | moderate |
| B | none | 1.1 | — | moderate |
|   | 15 DCPMA | 1.6 | F | slight |
|   | 40 DCPMA | 4.0 | F | trace |
|   | 15 Texanol$^R$ | 0.5 | F | moderate |

*cheesecloth placed against film under 2 psi pressure for two hours. Film evaluated for severity of imprinting by cheesecloth fibers

EXAMPLE 2

Coating Compositions Based on Soft Latex Polymers and DCPMA

Polymer C is an aqueous latex copolymer of monomeric composition: butyl acrylate, 53 parts; methyl methacrylate, 46 parts; and methacrylic acid, 1 part. The latex is neutralized with ammonium hydroxide and has a pH of 9.1. It is further characterized by: solids content, 46.5%, mean particle diameter, $0.1_\mu$; $T_i = 15°$ C; MFT = 12° C.

Polymer D is an aqueous latex copolymer of monomeric composition: butyl acrylate, 70 parts; methyl methacrylate, 29 parts; and methacrylic acid, 1 part. The latex is neutralized with ammonium hydroxide and has a pH of 9.0. It is further characterized by: solids content, 46.5%, mean particle diameter, $0.1_\mu$; $T_i = -7°$ C; MFT $\leq 0°$ C.

Coating compositions are prepared from polymers C and D respectively by adding DCPMA with stirring, followed by adding 0.1 part of cobalt (II) as the acetate and 0.25 part of cyclohexanone oxime per 100 parts of combined latex solids and DCPMA.

The coatings are deposited on steel test panels to yield 1.5 mil films when dry. After drying at ambient conditions for at least 2 weeks the coating properties are determined as shown in Table III.

TABLE III

| Polymer | Parts DCPMA per 100 Parts Latex Solids | Relative Tack | Knoop Hardness Number (KHN) | Pencil Hardness dry | Pencil Hardness wet | Rusting of Steel |
|---------|---------------------------------------|---------------|-----------------------------|---------------------|---------------------|------------------|
| C | 0 | none | 0.34 | 2B | <<6B | heavy |
|   | 40 | none | 0.50 | HB | 5B | none |
| D | 0 | tacky | 0.20 | 5B | — | heavy |
|   | 40 | tacky | 0.23 | 5B | — | moderate |
|   | 80 | sl. tack | 0.35 | 3B | — | trace |
|   | 120 | v. sl. tack | 0.65 | 2B | — | none |

EXAMPLE 3

Pigmented Latex Paint Containing DCPMA

Pigment dispersions are prepared by grinding the following on a Cowles dissolver for 15 minutes at 5500 feet/minute.

| Material | Parts by Weight |
|----------|-----------------|
| dispersant (Temol 731, 25%) | 10.8 |
| defoamer (Nopco NDW) | 2.0 |
| propylene glycol | 59.8 |
| rutile TiO$_2$ | 270.0 |

To the above dispersions are added, with stirring:

| Material | Paint A | Paint B | Paint C |
|----------|---------|---------|---------|
| propylene glycol | 69 | 32.2 | — |
| water | — | 30.0 | 30.0 |
| latex polymer B of Ex. 1 (46.5%) | 376 | 313.4 | 267.7 |
| DCPMA | — | 28.8 | 49.4 |
| cyclohexanone oxime | — | 0.43 | 0.44 |
| cobalt (II) acetyl acetonate | — | 0.76 | 0.77 |
| Texanol$^R$ | 26 | 0 | 0 |
| hydroxyethyl cellulose (2.5% in water) (Natrosol 250MR) | 49.1 | 71.6 | 80 |
| water |  | 38.7 | 86.9 |

All paints are 30 percent pigment volume concentration, pH of approximately 9.1 and Stormer viscosity of about 80-85 Krebs units. The paints are applied to steel test panels to yield 1.1 mil dry film thickness. After drying for two weeks at ambient the coating properties given in Table IV are observed.

Table IV

|  | Paint A | Paint B | Paint C |
|---|---------|---------|---------|
| Knoop Hardness Number (KHN) | 1.4 | 2.1 | 3.5 |
| Pencil Hardness | B | HB | HB |
| Reverse Impact (in-lb) | 40 | 40 | 40 |
| Print (140° F/2 psi/30') | slight | trace | none |
| Face-to-face Blocking (120° F/2 psi/60') | severe | poor | light |

TAMOL is a registered trademark of Rohm and Haas Company

NOPCO is a registered trademark of NOPCO Chemical Company

NATROSOL is a registered trademark of Hercules Incorporated.

What is claimed is:

1. A composition adapted to coat and/or impregnate a substrate consisting essentially of an aqueous dispersion of (a) a vinyl addition polymer, (b) at least one of dicyclopentenyl acrylate or dicyclopentenyl methacrylate, the proportion of the latter being from about 1% to 200% by weight, based on the weight of the polymer, and (c) an effective amount of a polyvalent metal-containing complex or salt that catalyzes the oxidative curing of (a) and (b).

2. A composition according to claim 1 further including a volatile aldehyde-oxime or ketone-oxime stabilizer.

3. A composition according to claim 1 wherein the vinyl addition polymer is dissolved in the aqueous phase, of the dispersion.

4. A composition according to claim 1 wherein the vinyl addition polymer is dispersed as water-insoluble particles and has an apparent second order transition temperature in the range of $-40°$ C. to $+150°$ C.

5. A composition according to claim 1 wherein the vinyl addition polymer is dispersed as water-insoluble particles and has an apparent second order transition temperature in the range of 15° C. to 100° C.

6. A composition according to claim 1 wherein the vinyl addition polymer is dispersed as water-insoluble particles and has an apparent second order transition temperature of 15° C. or lower.

7. A composition according to claim 3 in which the polymer contains hydrophilic groups selected from the group consisting of hydroxyl, carboxyl, amide and amine groups.

8. A composition according to claim 4 wherein the polymer is a copolymer of at least one member selected from the group consisting of methyl methacrylate, acrylonitrile, vinyl chloride, vinylidene chloride, vinyl acetate, styrene, and vinyltoluene and at least one member selected from the group consisting of $(C_1-C_{18})$alkyl acrylate and $(C_4-C_{18})$alkyl methacrylate.

9. A composition according to claim 6 in which the polymer is a copolymer containing methyl methacrylate units and ($C_1$-$C_4$)alkyl acrylate units copolymerized therein.

10. A composition according to claim 9 in which the copolymer also contains polymerized therein, acrylonitrile units.

11. A composition according to claim 1 wherein the polyvalent metal-containing complex and salts are used in the amount of from about 0.0005% to 2% on the basis of metal content.

12. A composition according to claim 1 further including one or more members of the group consisting of pigments, dispersing agents, sequestering agents, defoaming agents, humectants, thickeners, bactericides, fungicides, odor-modifying agents, and other resinous materials in dispersed forms.

13. An article of manufacture comprising a substrate containing on a surface thereof a cured film of the composition of claim 1.

14. An article of manufacture comprising a substrate containing on a surface thereof a cured film of the composition of claim 7.

15. An article of manufacture comprising a substrate containing on a surface thereof a cured film of the composition of claim 8.

16. An article of manufacture comprising a substrate contaning on a surface thereof a cured film of the composition of claim 9.

17. An article of manufacture comprising a substrate containing on a surface thereof a cured film of the composition of claim 10.

18. A method of making a coated article comprising the steps of (a) depositing the composition of claim 1 as a film on a substrate and (b) curing the coating.

19. A method of making a coated article comprising the steps of (a) depositing the composition of claim 7 as a film on a substrate and (b) curing the coating.

20. A method of making a coated article comprising the steps of (a) depositing the composition of claim 8 as a film on a substrate and (b) curing the coating.

21. A method of making a coated article comprising the steps of (a) depositing the composition of claim 9 as a film on a substrate and (b) curing the coating.

22. A method of making a coated article comprising the steps of (a) depositing the composition of claim 10 as a film on a substrate and (b) curing the coating.

* * * * *